United States Patent
Kurei et al.

(10) Patent No.: US 12,503,181 B2
(45) Date of Patent: Dec. 23, 2025

(54) AUTOMATIC WHEEL CONFIGURING DEVICE

(71) Applicant: Honda Motor Co., Ltd., Tokyo (JP)

(72) Inventors: Daiki Kurei, Tokyo (JP); Yosuke Tanaka, Tokyo (JP); Kosuke Hirano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 18/170,500

(22) Filed: Feb. 16, 2023

(65) Prior Publication Data

US 2023/0311567 A1 Oct. 5, 2023

(30) Foreign Application Priority Data

Mar. 29, 2022 (CN) .......................... 202210315335.7

(51) Int. Cl.
*B62D 65/02* (2006.01)
*B60B 3/16* (2006.01)
(Continued)

(52) U.S. Cl.
CPC ........... *B62D 65/028* (2013.01); *B62D 65/12* (2013.01); *G01B 21/26* (2013.01); *G06V 20/56* (2022.01)

(58) Field of Classification Search
CPC ...... B62D 65/028; B62D 65/12; B62D 65/18; G01B 21/26; G06V 20/56; G06V 10/44;
(Continued)

(56) References Cited

U.S. PATENT DOCUMENTS

| 4,635,339 A | * | 1/1987 | Kozlowski | .............. | B60B 29/00 |
| | | | | | 29/794 |
| 5,345,675 A | * | 9/1994 | Yamanaka | .............. | B62D 65/12 |
| | | | | | 356/153 |

(Continued)

FOREIGN PATENT DOCUMENTS

| CN | 104123542 B | * | 6/2017 |
| JP | S62122871 | | 6/1987 |

(Continued)

OTHER PUBLICATIONS

Ezra Tima Ameperosa, Bolt Detection and Position Estimation Using Domain Randomization, Aug. 2018, retrieved from—https://pab47.github.io/reports/Ezra_Ameperosa_MS_Thesis.pdf, 41 pages (Year: 2018).*

(Continued)

*Primary Examiner* — Yongjia Pan
(74) *Attorney, Agent, or Firm* — JCIPRNET

(57) ABSTRACT

The disclosure provides an automatic wheel configuring device that configures a wheel according to the inclination of a hub of a vehicle. The automatic wheel configuring device includes a detection device. The detection device takes an image of the hub or the wheel of the vehicle, and detects the positions of the hub bolts or the positions of the bolt holes of the wheel. The detection device includes an acquisition portion and a circle extraction portion. The acquisition portion acquires basic position information on the positions of the hub bolts or the positions of the bolt holes of the wheel. The circle extraction portion extracts a plurality of circles present in the captured image. Among the combinations of a plurality of circles, the circle extraction portion extracts a combination that matches the basic position information as a combination of hub bolts or a combination of bolt holes.

2 Claims, 6 Drawing Sheets

(51) Int. Cl.
*B62D 65/12* (2006.01)
*G01B 21/26* (2006.01)
*G06V 10/44* (2022.01)
*G06V 20/56* (2022.01)

(58) Field of Classification Search
CPC .... G06V 10/7515; G06V 10/752; B60B 3/16; B60B 27/0068; B60B 29/00
See application file for complete search history.

(56) References Cited

U.S. PATENT DOCUMENTS

| | | | | |
|---|---|---|---|---|
| 5,600,435 | A * | 2/1997 | Bartko | H04N 7/181 |
| | | | | 348/E7.086 |
| 10,773,550 | B1 * | 9/2020 | Downey | B25J 11/008 |
| 11,787,232 | B2 * | 10/2023 | Darolfi | B60B 29/008 |
| | | | | 29/894.31 |
| 11,861,276 | B2 * | 1/2024 | Vargo | B25J 9/1687 |
| 2006/0288577 | A1 * | 12/2006 | Bormuth | B23P 19/069 |
| | | | | 29/894 |
| 2009/0248191 | A1 * | 10/2009 | Kondo | B25J 9/1697 |
| | | | | 700/114 |
| 2021/0114408 | A1 * | 4/2021 | Darolfi | B60B 29/00 |
| 2025/0018577 | A1 * | 1/2025 | Chalofsky | B25J 13/08 |

FOREIGN PATENT DOCUMENTS

| | | | | |
|---|---|---|---|---|
| JP | H05221350 | | 8/1993 | |
| JP | H06190661 | | 7/1994 | |
| JP | H08501155 | A * | 2/1996 | ............ B23P 19/069 |
| JP | H0958541 | A * | 3/1997 | |
| JP | 2009178829 | | 8/2009 | |

OTHER PUBLICATIONS

Song Chen, Machine Vision recognition of Auto-hub, 2012, retrieved from—https://ieeexplore.ieee.org/stamp/stamp.jsp?tp=&arnumber=6394248&tag=1, 3 pages (Year: 2012).*

"Office Action of China Counterpart Application", issued on Oct. 16, 2025, with English translation thereof, p. 1-p. 10.

* cited by examiner

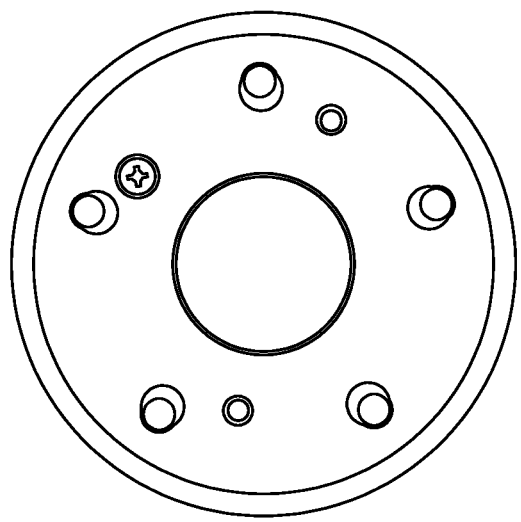
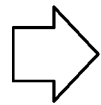
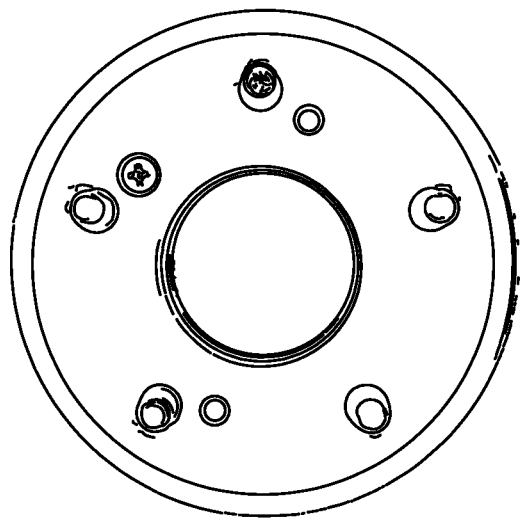
FIG. 4a                    FIG. 4b
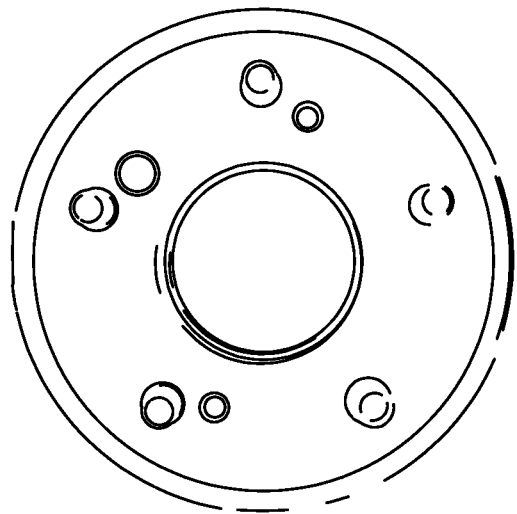
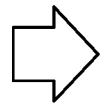
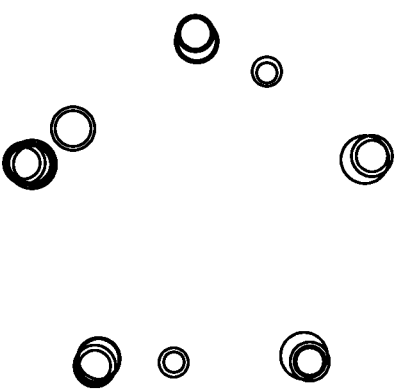
FIG. 4c                    FIG. 4d

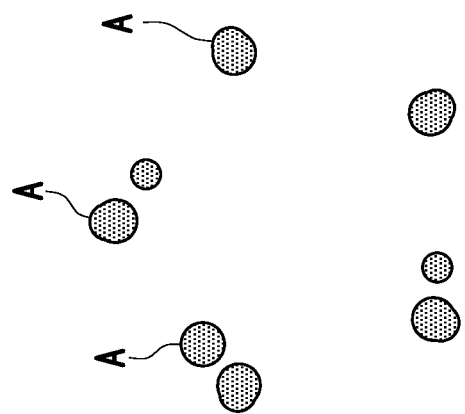
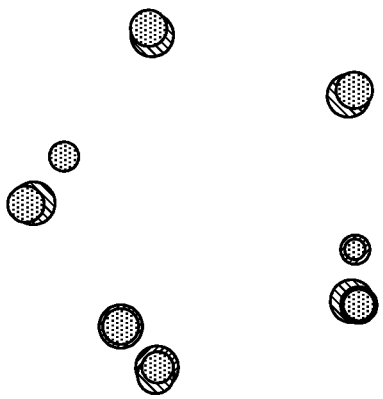
FIG. 5a
FIG. 5b

AUTOMATIC WHEEL CONFIGURING DEVICE

CROSS-REFERENCE TO RELATED APPLICATION

This application claims the priority benefit of China application no. 202210315335.7, filed on Mar. 29, 2022. The entirety of the above-mentioned patent application is hereby incorporated by reference herein and made a part of this specification.

BACKGROUND

Technical Field

The present disclosure relates to an automatic wheel configuring device, in particular to an automatic wheel configuring device for detecting the inclination of a hub of a vehicle for wheel configuration.

Description of Related Art

Efforts have been made for the purpose of slowing down climate change or mitigating impacts, and research and development related to reduction of carbon dioxide emissions are being carried out in order to achieve the above-mentioned purposes.

In an existing automatic wheel configuring device (JP Laid-Open No. 2009-178829), a stereo camera composed of a front camera and an oblique camera is utilized to detect the circular position at the front end of the hub bolt, and determine the center position (X, Y, Z) of the hub and the attitude of the hub surface (toe, camber and phase).

When detecting the roundness of the front end of the hub bolts, the position of the hub bolts (that is, the detection that does not require position accuracy) is roughly detected as a pre-processing to prevent false detection of round parts such as countersunk screws and maintenance hole cover on the hub surface. As a current rough detection method, the edge shape of the bolt is registered as a model in advance, and one of the bolts is detected through pattern matching. Then, the known phase relationship of the bolt positions (72° each in the case of 5 bolts and 90° each in the case of 4 bolts) is utilized to determine the range where the bolts are present, including the positions of the remaining bolts.

However, with the current rough detection method, when detecting bolts through pattern matching, countersunk screws, maintenance hole covers, etc. may be falsely detected. Due to the characteristics of pattern matching, if there is a difference between the stored model and the appearance of the bolts photographed when the wheel is configured, it would be difficult to perform detection accurately. In addition, since the success of rough bolt detection depends on the pattern matching detection result of a bolt, detection error is likely to occur in this case, and therefore detection time will increase, which leads to reduction of production efficiency and increased carbon dioxide emissions. In reducing the emission of carbon dioxide, how to improve the efficiency of detection and operation is an issue to be solved by practitioners of the field.

In view of the above aspects, the present disclosure aims at improving the efficiency of the automatic wheel configuring device in order to solve the above-mentioned problems. Moreover, it is possible to help moderate climate change or mitigate impacts.

SUMMARY

To achieve said purpose, the present disclosure is an automatic wheel configuring device for configuring a wheel according to the inclination of a hub of a vehicle. The automatic wheel configuring device includes a detection device. The detection device takes an image of the hub or the wheel of the vehicle, and detects the positions of the hub bolts or the positions of the bolt holes of the wheel. The detection device includes an acquisition portion and a circle extraction portion. The acquisition portion acquires basic position information on the positions of the hub bolts or the positions of the bolt holes of the wheel. The circle extraction portion extracts a plurality of circles present in the captured image. Among the combinations of a plurality of circles, the circle extraction portion extracts a combination that matches the basic position information as a combination of hub bolts or a combination of bolt holes.

In order to make the above-mentioned features and advantages of the present disclosure more comprehensible, the following specific embodiments are described in detail with accompanying drawings.

BRIEF DESCRIPTION OF THE DRAWINGS

FIG. 4a to FIG. 4d show an example of an edge extraction method according to an embodiment of the present disclosure.

FIG. 5a to FIG. 5b show an example of a region generation method according to an embodiment of the present disclosure.

DESCRIPTION OF THE EMBODIMENTS

Figure 1:
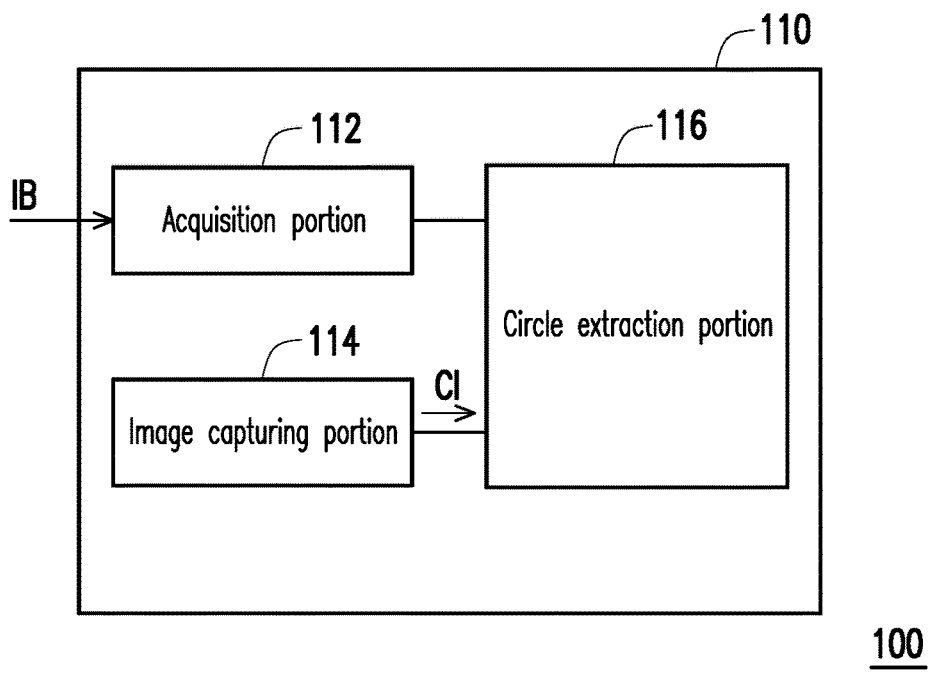
FIG. 1 shows a schematic block diagram of an automatic wheel configuring device according to an embodiment of the present disclosure.

Reference will now be made in detail to the exemplary embodiments of the present disclosure, examples of which are illustrated in the accompanying drawings. Wherever possible, the same reference numbers will be used in the drawings and description to refer to the same or like parts.

In an embodiment of the present disclosure, when there is no combination that matches the basic position information in the combination of multiple circles, at least one imaginary circle is created, and in the combinations of multiple circles and imaginary circles, the circle extraction portion extracts a combination matching the basic position information as a combination of hub bolts or a combination of bolt holes.

Based on the above, the automatic wheel configuring device of the present disclosure does not perform a difficult search through pattern matching among objects with similar shapes, but initially detects all the multiple circles including bolts, countersunk screws, and maintenance hole covers on the hub surface. Also, by performing the process of narrowing down candidate bolt circles (representative circles) and adding conditions during the search, it is possible to determine the search range that prevents false detection of other circle parts, reduce false detections during rough detection, and maintain real-time processing (the entire sensing process takes about 1.0 seconds) within the line takt. In this way, only candidate bolt circles will be extracted, and the search range may be determined to prevent false detection of other circle parts, thus improving the efficiency of automatic wheel configuring device.

FIG. 1 shows a schematic block diagram of an automatic wheel configuring device according to an embodiment of the present disclosure. The automatic wheel configuring device 100 is able to configure the wheels according to the inclination of the hub of a vehicle in a wheel configuration station of a vehicle manufacturing factory. Referring to FIG. 1, the automatic wheel configuring device 100 includes a detection device 110. The detection device 110 is able to take an image of the hub or the wheel of the vehicle, and detect the positions of the hub bolts or the positions of the bolt holes of the wheel. The detection device 110 includes an acquisition portion 112, an image capturing portion 114 and a circle extraction portion 116. The acquisition portion 112 is able to acquire the basic position information D3 of the positions of the hub bolts or the positions of the bolt holes of the wheel. For example, the acquisition portion 112 is able to acquire the pre-stored basic location information D3 from a memory or a cloud server, or input the basic position information D3 of the vehicle to the acquisition portion 112 by an operator through input devices such as input keys, a remote control, a touchpad or a touch panel having a resistive, capacitive or other types of touch sensor components. The basic position information D3 includes information such as the position and number (4 or 5) of hub bolts of vehicles on the production line, the position and number (4 or 5) of bolt holes of wheels, and the distance between each of the bolts or the bolt holes. The acquisition portion 112 is able to be realized by, for example, a circuit capable of processing information data such as a large scale integrated circuit (LSI) or an application specific integrated circuit (ASIC).

The image capturing portion 114 is, for example, a camera, which is able to take an image of a hub or a wheel of the vehicle to generate a captured image CI, and transmit the captured image CI to the circle extraction portion 116.

The circle extraction portion 116 is, for example, a central processing unit (CPU), or other programmable general-purpose or special-purpose microprocessor, a digital signal processor (DSP), a programmable controller, an application specific integrated circuit (ASIC) or other similar components or a combination of the above components. The circle extraction portion 116 is coupled to the acquisition portion 112 and the image capturing portion 114. The circle extraction portion 116 is able to extract a plurality of circles present in the captured image CI. Among the extracted combinations of circles, the circle extraction portion 116 may extract a combination matching the basic position information D3 as a combination of hub bolts or a combination of bolt holes.

Figure 2:
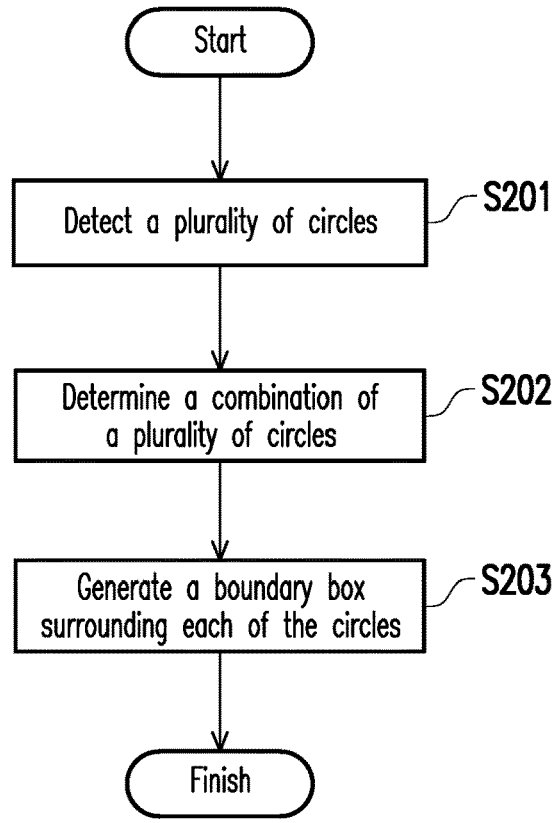
FIG. 2 shows a flowchart of a rough detection method according to an embodiment of the present disclosure.

FIG. 2 shows a flowchart of a rough detection method according to an embodiment of the present disclosure. Please refer to FIG. 1 and FIG. 2 at the same time. The detection method of this embodiment is applicable to the automatic wheel configuring device 100 in FIG. 1, which is able to analyze the captured image CI of the hub or the wheel of the vehicle, and filter out the circles formed by the hub bolts or bolt holes to facilitate the automatic wheel configuring device 100 to accurately carry out wheel configuration. The detection method of the embodiment of the present disclosure will be described below in combination with various components in the automatic wheel configuring device 100.

First, in step S201, the circle extraction portion 116 detects a plurality of circles in the captured image CI. Next, in step S202, the circle extraction portion 116 determines a combination of a plurality of circles among the detected circles. Finally, in step S203, the circle extraction portion 116 generates a boundary box surrounding each of the circles.

Figure 3:
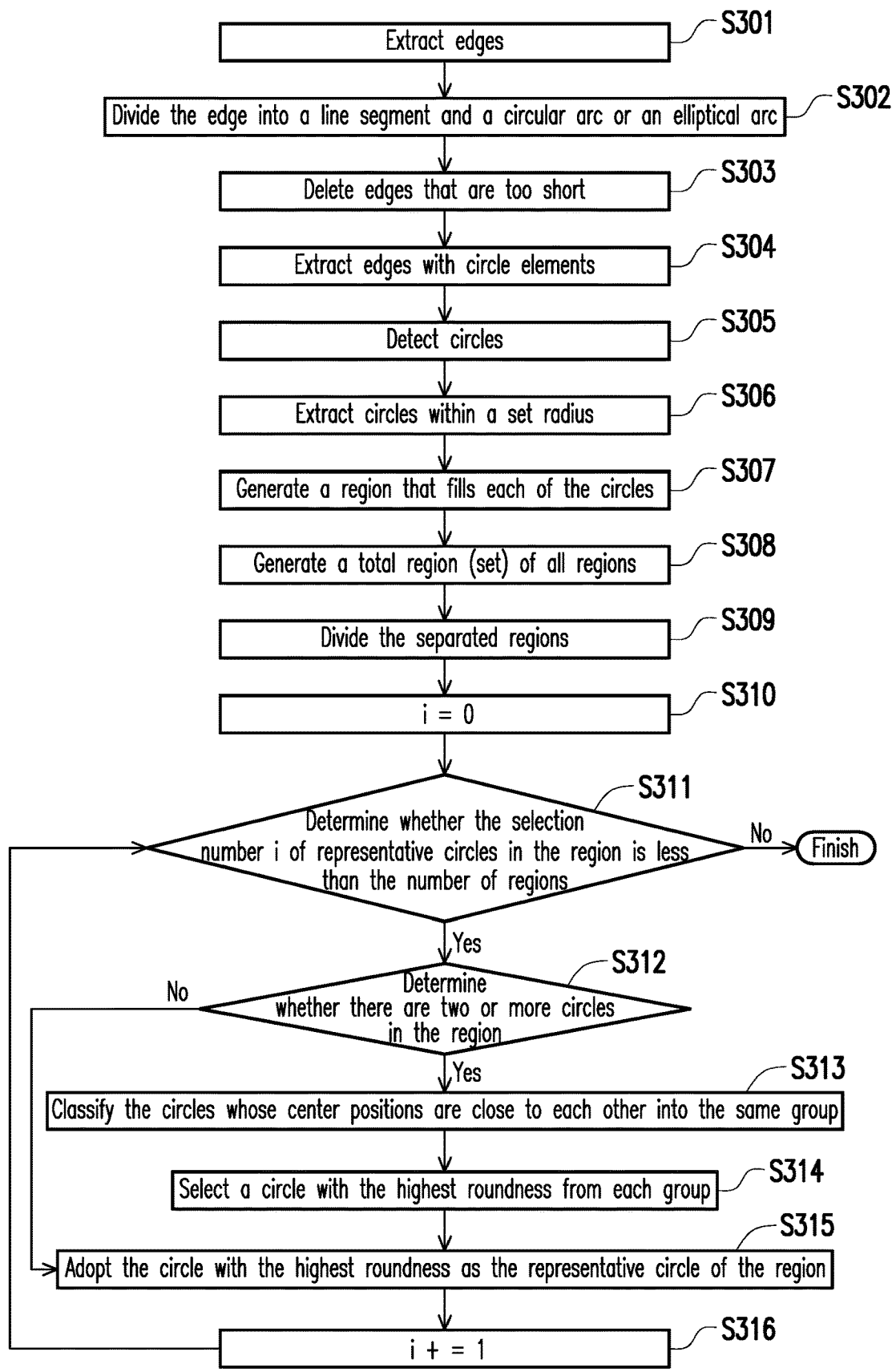
FIG. 3 shows a flowchart of a method for detecting multiple circles according to an embodiment of the present disclosure.

For a detailed description of the multi-circle detection method in step S201 of FIG. 2, reference may be made to various steps in FIG. 3. FIG. 3 shows a flowchart of a method for detecting multiple circles according to an embodiment of the present disclosure. First, in step S301, the circle extraction portion 116 extracts edges from the captured image CI. Specifically, the circle extraction portion 116 may scan the captured image CI, search for an edge that can form a part of a circle, and extract the edge. In step S302, the circle extraction portion 116 divides the extracted edge into a line segment and a circular arc or an elliptical arc. Next, in step S303, the circle extraction portion 116 deletes edges that are too short. Next, in step S304, the circle extraction portion 116 extracts edges with circle elements. Thereafter, in step S305, the circle extraction portion 116 detects a circle formed by edges with circle elements. Then, in step S306, the circle extraction portion 116 extracts circles within a set radius from the detected circles. The set radius is determined based on the radius of the hub bolt or the radius of the bolt hole of the vehicle, so that the circle extraction portion 116 delete circles that do not fit the hub bolt or the bolt hole.

FIG. 4a to FIG. 4d show an example of an edge extraction method according to an embodiment of the present disclosure. FIG. 4a shows a captured image CI of the hub bolts. FIG. 4b shows the situation where an edge is extracted from the captured image CI. Since all the edges that can form a part of a circle are extracted from the captured image CI, many very short edges appear in FIG. 4b. FIG. 4c shows the situation after deleting edges that are too short. Compared with FIG. 4b, FIG. 4c only shows longer edges that are more likely to form a complete circle. FIG. 4d shows the situation after extracting the circles within the set radius from the detected circles, and further filtering to leave the circles that might fit the hub bolts.

In step S307 of FIG. 3, the circle extraction portion 116 generates a region that fills each of the circles. Next, in step S308, the circle extraction portion 116 generates a total region (set) of all regions. Specifically, the overlapping circular regions are integrated into one region. Then, in step S309, the circle extraction portion 116 divides the separated regions.

FIG. 5 shows an example of a region generation method according to an embodiment of the present disclosure. FIG. 5a shows the situation of generating the region that fills each of the circles. FIG. 5b shows the situation of integrating overlapping circular regions into one region and dividing the separated regions. For example, eight regions A are included in FIG. 5b.

In step S310 of FIG. 3, the circle extraction portion 116 presets i as 0. Next, in step S311, the circle extraction portion 116 determines whether the selection number i of representative circles in the region is less than the number of regions. Specifically, the circle extraction portion 116 may compare the number of divided regions with the selection number i of representative circles in the currently selected region. When the selection number i is less than the number of regions, in step S312, the circle extraction portion 116 determines for one of the regions whether there are two or more circles in the region. When there are not more than two circles in this region, it means that there is only one circle in this region, then proceed to step S315, and the circle extraction portion 116 adopts a circle as a representative circle of this region.

When the circle extraction portion 116 determines that there are two or more circles in the region in step S312, the circle extraction portion 116 classifies the circles whose center positions are close to each other into the same group in step S313. Specifically, the circle extraction portion 116 may classify circles whose distances between center positions are equal to or less than a set value into the same group. The smaller the set value is, the longer the processing time will be, and the possibility of using the front end circle of the bolt as a representative circle will increase. The larger the set value is, the shorter the processing time will be. The set value may be set by the operator according to the actual needs.

In step S314, the circle extraction portion 116 selects a circle with the highest roundness from each group. Next, in step S315, the circle extraction portion 116 adopts the circle with the highest roundness as the representative circle of the region. Then, in step S316, the circle extraction portion 116 increments the selection number i. Thereafter, step S311 is resumed to determine again whether the selection number i of representative circles in the region is less than the number of regions. If not, the detection method of this embodiment is terminated. If yes, the next region is processed subsequently in step S312.

Figure 6:
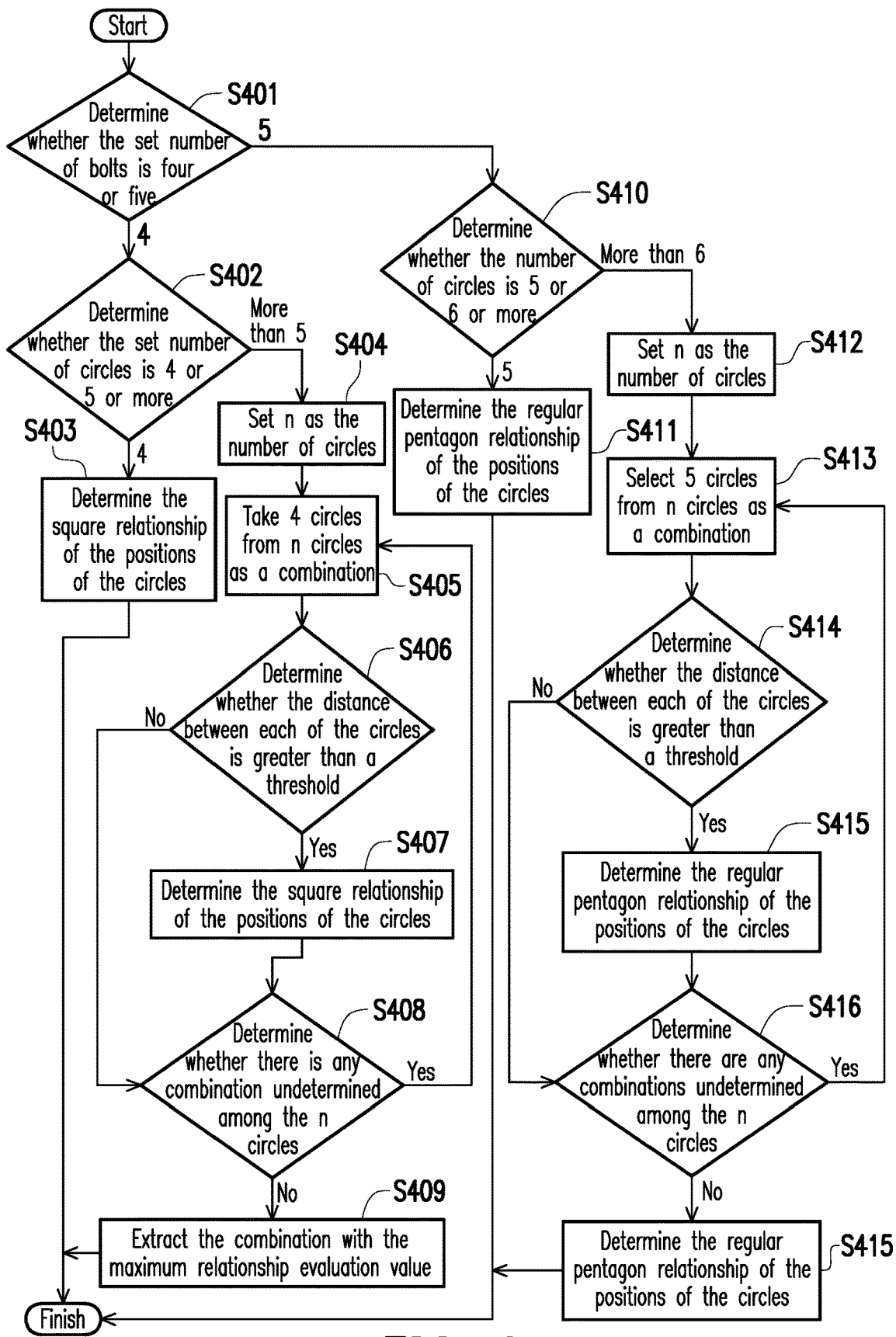
FIG. 6 shows a flowchart of a method for determining a combination of multiple circles according to an embodiment of the present disclosure.

For the detailed step description of the method for determining the combination of multiple circles in step S202 of FIG. 2, reference may be made to various steps in FIG. 6. FIG. 6 shows a flowchart of a method for determining a combination of multiple circles according to an embodiment of the present disclosure. First, in step S401, the circle extraction portion 116 determines whether the set number of bolts is four or five based on the basic position information IB. When the number of bolts is 4, in step S402, the circle extraction portion 116 determines whether the number of representative circles in the region is 4 or 5 or more. When the number of representative circles in the region is four, in step S403, the circle extraction portion 116 determines the square relationship of the positions of the circles. Specifically, the ratio of distance between each of the corners of the square is fixed, and the circle extraction portion 116 is able to calculate whether the relationship between the representative circles in the region conforms to this ratio. For example, the circle extraction portion 116 may calculate the distance from a representative circle in any region to the representative circles (the other three) in other regions. In this embodiment, the distances are sorted into d1, d2, and d3 in order from short to long, and the error value e of the distance ratio is calculated. The error value e, for example, satisfies the following relationship: $e=((d2/d1)-1)+((d3/d1)-\sqrt{2})$. Starting from each of the 4 circles to calculate each of the error values e, the total error value E of the square, for example, satisfies the following relationship: $E=\Sigma_{n=1}^{4} e_n$. The circle extraction portion 116 is able to generate a relationship evaluation value corresponding to a combination of multiple circles according to the calculated total error value E.

On the other hand, when the circle extraction portion 116 determines in step S402 that the number of representative circles in the region is 5 or more, the circle extraction portion 116 sets n as the number of circles in step S404, and then in step S405 take 4 circles from n circles as a combination. Thereafter, in step S406, the circle extraction portion 116 determines whether the distance between each of the circles in the combination is greater than a threshold. If yes, in step S407, the circle extraction portion 116 determines the square relationship of the positions of the circles. If not, proceed directly to step S408. In step S408, the circle extraction portion 116 determines whether there is any combination undetermined among the n circles. If yes, step S405 is resumed to continue processing the next combination. If not, in step S409, the circle extraction portion 116 extracts the combination with the maximum relationship evaluation value, which is, for example, the combination with the lowest calculated total error value E.

When the circle extraction portion 116 determines that the number of bolts is 5 in step S401, in step S410, the circle extraction portion 116 determines whether the number of representative circles in the region is 5 or 6 or more. When the number of representative circles in the region is 5, in step S411, the circle extraction portion 116 determines the regular pentagon relationship of the positions of the circles. Specifically, the ratio of distance between each of the corners of the regular pentagon is fixed, and the circle extraction portion 116 may calculate whether the relationship between the five representative circles in the region conforms to this ratio. For example, the circle extraction portion 116 may calculate the distance from a representative circle in any region to other representative circles (the other four) in other regions. In this embodiment, the distances are sorted into d1, d2, d3, d4 in order from short to long, and the error value e of the distance ratio is calculated. For example, the error value e satisfies the following relationship: $e=((d2/d1)-1)+((d3/d1)-1)+((d3/d1)-((1+\sqrt{5})/2))+((d4/d1)-((1+\sqrt{5})/2))$. Starting from each of the 5 circles to calculate each of the error values e, the total error value E of the regular pentagon, for example, satisfies the following relationship: $E=\Sigma_{n=1}^{5} e_n$. The circle extraction portion 116 may generate a relationship evaluation value corresponding to a combination of multiple circles according to the calculated total error value E.

On the other hand, when the circle extraction portion 116 determines in step S410 that the number of representative circles in the region is 6 or more, the circle extraction portion 116 sets n as the number of circles in step S412, and then selects 5 circles from n circles in step S413 as a combination. Then, in step S414, the circle extraction portion 116 determines whether the distance between each of the circles in the combination is greater than a threshold. If yes, in step S415, the circle extraction portion 116 determines the regular pentagon relationship of the positions of the circles. If not, proceed directly to step S416. In step S416, the circle extraction portion 116 determines whether there are any combinations undetermined among the n circles. If yes, step S413 is resumed to continue processing the next combination. If not, then in step S417, the circle extraction portion 116 extracts the combination with the maximum relationship evaluation value, which is, for example, the combination with the lowest calculated total error value E.

Thus, in step S203 of FIG. 2, the circle extraction portion 116 will generate a boundary box around each of the circles for each of the circles in the combination with the maximum relationship evaluation value, so that the automatic wheel configuring device 100 is able to accurately configure the wheels.

Figure 7B:
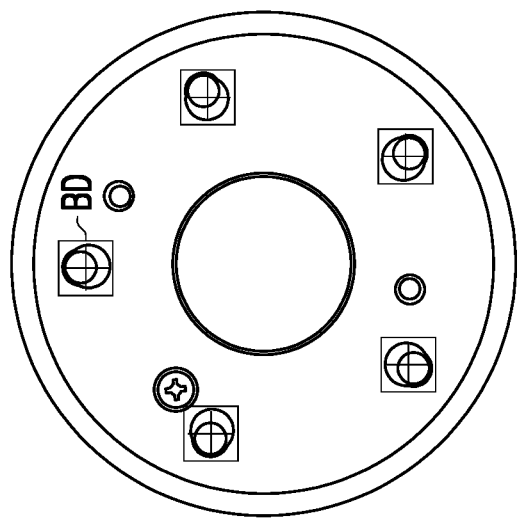
FIG. 7a to FIG. 7b show an example of a boundary box generation method according to an embodiment of the present disclosure.
Figure 7A:
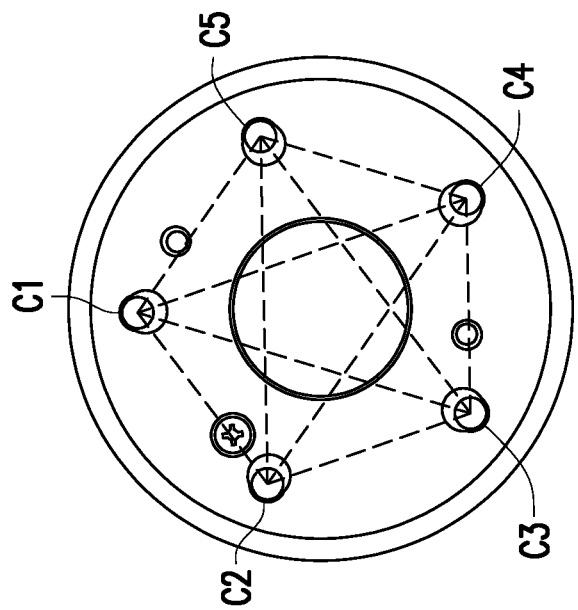

FIG. 7a to FIG. 7b show an example of a boundary box generation method according to an embodiment of the present disclosure. FIG. 7a shows the situation of extracting a combination with the maximum relationship evaluation value. As shown in FIG. 7a, the combination with the maximum evaluation value includes circles C1 to C5, and it can be seen from the dashed lines in the figure that the positions of the circles C1 to C5 are closest to the regular pentagonal combination. FIG. 7b shows the situation where the circle with the highest roundness is selected. In FIG. 7b, a quadrilateral region surrounding the extracted circle is generated as a boundary box BD, which is used as a reference for alignment when configuring the wheels, thereby completing the rough detection method of this embodiment.

In an embodiment, when there is no combination matching the basic position information D3 among the combinations of multiple circles, the circle extraction portion 116 may create at least one imaginary circle according to the basic position information IB, and extract, among the combinations of multiple circles and the created imaginary circles, a combination matching the basic position information D3 as a combination of hub bolts or a combination of bolt holes.

It should be noted that although hub bolts are illustrated in the examples in FIG. 4a to FIG. 4d, FIG. 5a to FIG. 5b and FIG. 7a to FIG. 7b, a similar detection method may be applied to the bolt holes on the wheel to find the combination with the lowest error value.

In an embodiment, for the hub bolts identified by the above method, the hub bolts may be identified through machine learning. By using images from the front camera in mass production, the learned artificial intelligence (AI) detects 4 or 5 hub bolts. For the AI hub bolt matching ratio which is less than a specific threshold, automatic annotation is performed and additional learning is performed. In addition, if one of the 4 or 5 hub bolts is not detected, the positions of the remaining 3 or 4 bolts will be estimated and detected based on the drawing values, and automatically annotated to improve detection accuracy through additional learning. Annotation is the addition of relevant information (metadata) to some data as annotations. Metadata is normally tagged by using a descriptive format such as XML.

In summary, the automatic wheel configuring device of the present disclosure does not perform a difficult search through pattern matching among objects with similar shapes, but initially detects all the multiple circles including bolts, countersunk screws, and maintenance hole covers on the hub surface. Also, by performing the process of narrowing down candidate bolt circles (representative circles) and adding conditions during the search, it is possible to determine the search range that prevents false detection of other circle parts, and reduce false detections during rough detection, thus improving the efficiency of automatic wheel configuring device, and helping to moderate climate change or mitigating impacts.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. An automatic wheel configuring device for configuring a wheel according to an inclination of a hub of a vehicle, comprising:
    a detection device, which takes an image of the hub or the wheel of the vehicle, and detects positions of hub bolts or positions of bolt holes of the wheel,
    wherein the detection device comprises:
        an acquisition portion, which acquires basic position information on the positions of the hub bolts or the positions of the bolt holes of the wheel; and
        a circle extraction portion, which extracts edges with circle elements in the captured image, detects a plurality of first circles formed by the edges with circle elements, extracts a plurality of second circles from the detected first circles according to a set radius, classifies the plurality of second circles into a plurality of groups based on center positions, and selects a plurality of representative circles from the plurality of groups based on roundness,
    wherein among combinations of the plurality of representative circles, the circle extraction portion extracts a combination that matches the basic position information as a combination of the hub bolts or a combination of the bolt holes to configure the wheel.

2. The automatic wheel configuring device according to claim 1, wherein when there is no combination that matches the basic position information in the combination of the plurality of second circles, at least one imaginary circle is created, and in combinations of the plurality of second circles and the imaginary circle, the circle extraction portion extracts a combination matching the basic position information as the combination of the hub bolts or the combination of the bolt holes.

* * * * *